United States Patent [19]
Courtney et al.

[11] 4,066,335
[45] Jan. 3, 1978

[54] VARIABLE DENSITY LENS

[75] Inventors: John E. Courtney, Fairport; Charles J. Urso, Webster; Gary A. Dir, Fairport, all of N.Y.

[73] Assignee: Xerox Corporation, Stamford, Conn.

[21] Appl. No.: 650,330

[22] Filed: Jan. 19, 1976

[51] Int. Cl.² ............................................. G02F 1/13
[52] U.S. Cl. ........................ 350/160 LC; 350/220; 354/227
[58] Field of Search .............. 350/160 LC, 175 DR, 350/150, 220; 354/227

[56] References Cited

U.S. PATENT DOCUMENTS

| | | | |
|---|---|---|---|
| 1,777,262 | 9/1930 | Hasselkus et al. | 350/220 X |
| 1,792,917 | 2/1931 | Morte | 350/220 X |
| 3,555,987 | 1/1971 | Hadden | 354/227 |
| 3,652,148 | 3/1972 | Wysocki et al. | 350/150 |
| 3,741,629 | 6/1973 | Kahn | 350/160 LC |
| 3,844,650 | 10/1974 | Nicholson et al. | 350/160 LC X |
| 3,890,628 | 6/1975 | Gurtler | 350/160 LC X |
| 3,912,369 | 10/1975 | Kashnow | 350/160 LC |
| 3,918,796 | 11/1975 | Ferguson | 350/160 LC |
| 3,955,208 | 5/1976 | Wick et al. | 350/160 LC X |
| 3,972,587 | 8/1976 | Scheffer | 350/150 |

Primary Examiner—Edward S. Bauer
Attorney, Agent, or Firm—James J. Ralabate; George J. Cannon; James P. O'Sullivan

[57] ABSTRACT

A lens is fabricated with a layer of liquid crystalline material between electrodes, wherein the liquid crystalline composition is capable of altering the state of polarization of light when a voltage is applied between the electrodes. A linear polarizer and an analyzer are used in conjunction with the lens, and optionally are incorporated into the lens.

3 Claims, 4 Drawing Figures

1

VARIABLE DENSITY LENS

BACKGROUND OF THE INVENTION

This invention relates to lenses, and, more particularly, to lenses of variable neutral density.

Imaging systems in machines such as those disclosed in U.S. Pat. Nos. 3,431,053; 3,331,181 and 3,832,057, while producing satisfactory and acceptable images, lack simple and reliable means for automatically varying the exposure control of the optical image processed through the optical systems employed. Typically, these apparatus and machines, particularly xerographic copying machines, employ photosensitive members which respond to the total exposure to which they are subjected.

The total exposure, in turn, is a product of intensity and exposure time. These aforementioned imaging apparatus and machines typically have mechanical means for adjusting exposure. An iris is used to uniformly vary the intensity while slits are used to vary the width of the exposed regions, i.e., the exposure time.

In general, liquid crystal optical states that can be utilized are those which alter the state of polarization of light. These optical states require the use of a linear polarizer and analyzer. Alteration of the state of polarization has been accomplished in uniform fashion by the mechanism of field effects.

Electro-optical field effects with liquid crystalline materials are known. Speaking generally, liquid crystalline compositions which change the state of polarization and therefore alter the passage of light therethrough when used in conjunction with a linear polarizer and an analyzer are known in the art. U.S. Pat. Nos. 3,652,148 and 3,731,986 are illustrative of field effects.

SUMMARY OF THE INVENTION

It is an object of the invention to provide a novel lens.

It is another object of the invention to provide a novel lens of variable density.

The foregoing objects and others are accomplished in accordance with the practice of the present invention by incorporating into the fabrication of a lens a liquid crystalline composition capable upon application of a voltage thereacross of altering the state of polarization of light. The composition is sandwiched between two conductive surfaces, one surface having a linear polarizer and the other a linear analyzer.

BRIEF DESCRIPTION OF THE DRAWINGS

For a better understanding of the invention as well as other objects and further features thereof, reference is made to the following detailed disclosure of the preferred embodiments of the invention taken in conjunction with the accompanying drawings thereof wherein.

DESCRIPTION OF THE PREFERRED EMBODIMENT

Figure 1:
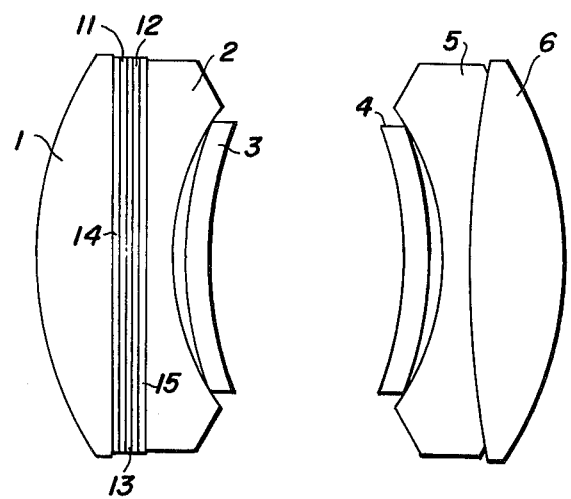
FIG. 1 is a schematic illustration of an embodiment of the lens of the present invention used in transmission.

Referring now to FIG. 1 there is schematically illustrated the variable density lens of the present invention. A multi-element lens is depicted in FIG. 1 comprising general optical elements 1 through 6. Elements 1 and 6, 2 and 5, and 3 and 4 are depicted as identical to illustrate a full, as opposed to half, lens which is typically used in transmission. In between elements 1 and 2 there is an electro-optic cell comprising, in turn, a linear polarizer 14, a conductive layer 11, a layer 13 of liquid crystalline composition which is capable of altering the state of polarization of light upon application of a voltage, conductive layer 12 and analyzer 15. The polarizer 14 and analyzer 15 are optionally fabricated in the cell; they can be located anywhere in the optical path in which the lens is located with polarizer 14 before the lens and analyzer 15 after the lens in the direction of light traveling along the optical pathway.

The location of the electro-optic cell between elements 1 and 2 in FIG. 1 will generally be accompanied by the inclusion of an optical element to maintain aberration balance in a previously designed lens which is modified by inclusion of the cell and to shift the aperture stop to the location of the cell. However, locating the cell at the center of symmetry of a symmetrical lens system will obviate the additional element. For example, in FIG. 1 the center of symmetry is midway between elements 3 and 4. The aperture stop location of the cell also generally provides more uniform exposure control.

The planes of polarization of the linear polarizer and analyzer may be crossed or parallel, which is an option depending on the choice as to light transmission or extinction in the electrically activated state. For example, as is known, a nematic liquid crystalline composition provided in the twisted nematic state with a 90° twist as disclosed in U.S. Pat. No. 3,731,986 will rotate the plane of polarization of linearly polarized light 90°. Therefore, if the planes of polarization of the linear polarizer 14 and analyzer 15 are parallel, the light passing through a layer 13 of twisted nematic will undergo a 90° rotation in its initial plane of polarization (initially parallel to the plane of polarization of linear polarizer 14) so that it emerges from layer 13 with a plane of polarization orthogonal to the plane of polarization of analyzer 15 and thereby blocked from passing through analyzer 15. Conversely, if the plane of polarization of the analyzer is orthogonal to the plane of polarization of the linear polarizer, the light emerging from layer 13 of twisted nematic will then have a plane of polarization parallel to that of the analyzer and will pass through the analyzer.

In both of the above described orientations of polarizer and analyzer we have described the results without application of voltage between conductive layers. In the first case, above, light is blocked by, and in the second case, above, light is transmitted through, analyzer 15. When a voltage is applied between conductive layers 11 and 12, and therefore across layer 13 of nematic liquid crystalline composition in the twisted nematic structure, the tilt of the molecules of the liquid crystalline material is altered when the material is of positive dielectric anisotropy and causes a change in the amount of rotation that the plane of polarization of light is subjected to in passing through layer 13. Generally, the greater the voltage, the greater the tilt; and the greater the tilt, the less the rotation of linearly polarized light. In the first case, above, with linear polarizer and analyzer oriented with planes of polarization parallel to one another, increasing voltage will result in increasing amounts of light passing through the analyzer; whereas, in the second case, above, with linear polarizer and analyzer oriented with planes of polarization orthogonal to one another, increasing voltage will result in decreasing amounts of light passing through the analyzer. In this way, the lens is provided with the capability of performing a variable density function.

Also, the linear polarizer and analyzer could be oriented at some angle such as 45° between their planes of polarization so that changes in voltage can be employed to allow either more or less light to pass through the analyzer 15. For a more complete description of the twisted nematic structure of nematic liquid crystalline materials, see U.S. Pat. No. 3,731,986, hereby expressly incorporated by reference and M. Schadt and W. Helfrich, "Voltage Dependent Optical Activity of a Twisted Nematic Liquid Crystal", *Applied Physics Letters*, Volume 18, Number 4.

In addition to the utilization of the twisted nematic structure in layer 13, the liquid crystalline compositions and field effects for use in accordance with the practice of the present invention include any liquid crystalline composition suitable to alter the state of polarization of light upon application of a voltage. Typical suitable compositions include cholesteric liquid crystalline materials which are phase transformed to the nematic mesophase as disclosed in U.S. Pat. No. 3,652,148 hereby expressly incorporated by reference; and the Distortion of Aligned Phases (DAP) effect in liquid crystalline compositions.

Conductive layers 11 and 12 can comprise any suitable conductive material. Typical suitable conductive materials include metals such as platinum, silver, tin, aluminum, gold, copper, indium, and gallium; conductive metal oxides such as, for example, tin oxide and indium oxide; insulating substrates coated with conductive layers such as NESA glass comprising a thin coating of tin oxide over glass and commercially available from Pittsburgh Plate and Glass Company can be used as layers 11 and 12. The conductive materials may be suitably coated upon glass substrates or upon linear polarizer 14 and analyzer 15 by any known conventional techniques such as, for example, vacuum evaporation. These conductive materials are provided in a very thin coating so as to be transmissive to the light or radiation in optical imaging. The same materials as well as ordinary mirroring techniques can be utilized to provide the reflective coating 21 in embodiments (FIGS. 2-2) where the lens is to operate in reflection rather than transmission. When the same materials are utilized to provide a reflective coating, it will be appreciated that the thickness of the coating is sufficient to provide a highly reflective coating.

Linear polarizer 14 and analyzer 15 may be selected from any of many various materials. Typical suitable materials are commercially available from Polaroid Corporation under the trade name Polaroid Sheet. The linear polarizer and analyzer may each be made from Polaroid Sheet material.

Figure 2:
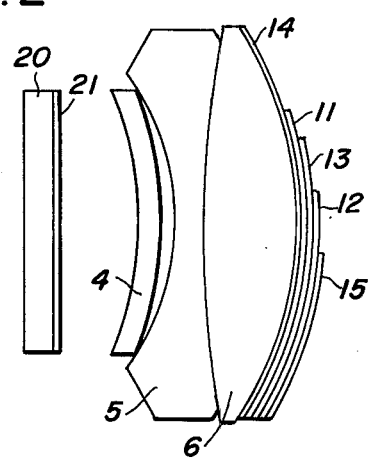
FIG. 2 is a schematic illustration of one embodiment of the lens of the present invention used in reflection.
Figure 3:
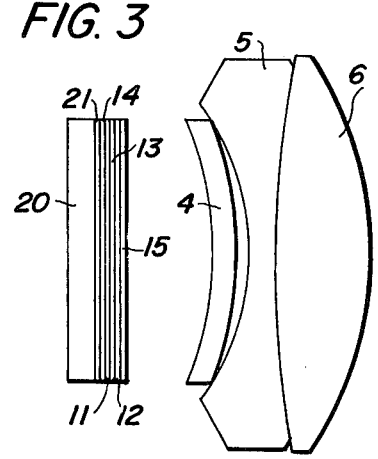
FIG. 3 is a schematic illustration of another embodiment of the lens of the present invention used in reflection.

Referring now to FIGS. 2 and 3, there are schematically illustrated embodiments of the present invention wherein the lenses are adapted for use in reflection and constitute half-lenses. A mirror 21 is located in the equivalent plane of symmetry of the lens so that light passing through the lens is reflected back through the lens and receives optical treatment equivalent to that which it would have received in passing through the full lens system. In FIG. 2, elements 11 through 15 are provided on the front surface of lens element 6 whereas in FIG. 3, elements 11 through 15 are provided on the surface of mirror 21. Either of the FIG. 2 and 3 embodiments can be utilized, while the FIG. 3 embodiment lends itself to more uniform control and to ease in fabrication. The FIG. 2 embodiment includes an optical element to maintain aberration balance and shift the aperture stop to the cell location.

Figure 4:
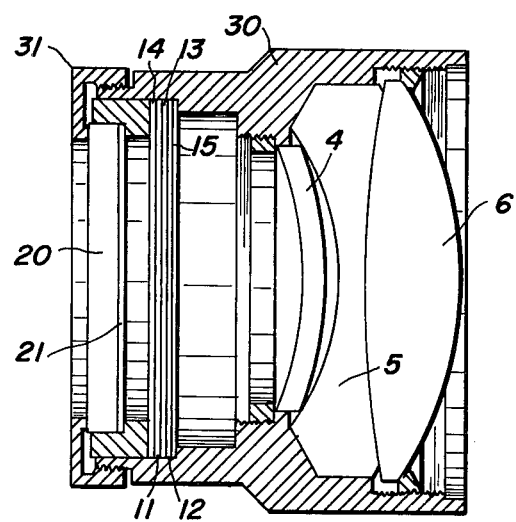
FIG. 4 is a schematic illustration of another embodiment of the lens of the present invention.

FIG. 4 schematically illustrates another embodiment of the present invention and one wherein elements 11 through 15 need not be in contact with other lens elements. Housing member 30 and 31 are adapted to become secured to one another by suitable means such as the threads depicted in FIG. 4. Elements 11 through 15 are fabricated into an integral unit and held by housing members 30 and 31 in spaced apart relationship from and in between mirror 21 and lens element 4.

It will be appreciated that other variations and modifications can be made in practice of the present invention upon a reading of the present disclosure. These are intended to be within the scope of the present disclosure.

For example, each of the locations for elements 11 through 15 depicted in FIGS. 1, 2 and 4 can be utilized irrespective of whether the lens is a full lens as in FIG. 1 or a half lens as in FIGS. 2 and 4; that is, the locations for elements 11 through 15 can be located anywhere on or in between elements of either a full lens or a half lens.

Further, it will be appreciated that the lens elements depicted in FIGS. 1-4 do not restrict the practice of the present invention. For example, the lenses depicted in the drawings are of the split-Dagor type, FIG. 1 being a full lens illustration 1 and FIGS. 2-4 being half-lens illustrations. Optical elements 1 and 6 are positive crowns, optical elements 2 and 5 are negative flints and optical elements 3 and 4 are positive meniscuses, as illustrated in the drawings; and optical elements 1 and 2, and 5 and 6 are illustrated as doublets. While these particular elements are shown in the drawings to illustrate the preferred embodiment of the present invention, it will be appreciated that the invention can be practiced with any lens.

What is claimed is:

1. A variable density, split-Dagor lens, comprising a positive crown, a negative flint, a positive meniscus and an electro-optic cell laminated thereto; said electro-optic cell comprising in sandwich configuration a linear polarizer, a layer of conductive material, a liquid crystalline composition capable of altering the state of polarization of light when a voltage is applied thereacross, another layer of conductive material, and an analyzer.

2. The lens of claim 1 wherein said electro-optic cell is laminated between said positive crown and said negative flint.

3. The lens of claim 1 wherein said electro-optic cell is laminated on the front surface of said positive crown.

* * * * *